(12) United States Patent
Nohara et al.

(10) Patent No.: US 11,958,270 B2
(45) Date of Patent: Apr. 16, 2024

(54) INTERMEDIATE FILM FOR LAMINATED GLASSES, LAMINATED GLASS, AND METHOD FOR MANUFACTURING HEAD UP DISPLAY SYSTEM

(71) Applicant: SEKISUI CHEMICAL CO., LTD., Osaka (JP)

(72) Inventors: Atsushi Nohara, Kouka (JP); Yuusuke Oota, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 796 days.

(21) Appl. No.: 16/971,535

(22) PCT Filed: Mar. 29, 2019

(86) PCT No.: PCT/JP2019/013952
§ 371 (c)(1),
(2) Date: Aug. 20, 2020

(87) PCT Pub. No.: WO2019/189741
PCT Pub. Date: Oct. 3, 2019

(65) Prior Publication Data
US 2021/0078303 A1 Mar. 18, 2021

(30) Foreign Application Priority Data
Mar. 29, 2018 (JP) .................. 2018-065771

(51) Int. Cl.
*G02B 27/01* (2006.01)
*B32B 3/26* (2006.01)
(Continued)

(52) U.S. Cl.
CPC ........ *B32B 17/10761* (2013.01); *B32B 3/263* (2013.01); *B32B 17/10* (2013.01);
(Continued)

(58) Field of Classification Search
CPC ...... G02B 2027/0118; G02B 2027/012; G02B 2027/0121; G02B 5/208; B32B 17/10568;
(Continued)

(56) References Cited

U.S. PATENT DOCUMENTS

2007/0009714 A1 1/2007 Lee et al.
2009/0294212 A1* 12/2009 Miyai ..................... B32B 17/06
                                                                    181/289
(Continued)

FOREIGN PATENT DOCUMENTS

CN       102471153 A       5/2012
CN       104428267 A       3/2015
(Continued)

OTHER PUBLICATIONS

Manz et al.; WO 2018/041472 A1; Mar. 8, 2018; Machine Translation in English (Year: 2018).*
(Continued)

*Primary Examiner* — Ryan D Howard
(74) *Attorney, Agent, or Firm* — Cheng Law Group, PLLC

(57) ABSTRACT

Provided is an interlayer film for laminated glass capable of enhancing the heat shielding property, suppressing multiple images, and satisfactorily displaying an image. An interlayer film for laminated glass according to the present invention is an interlayer film for laminated glass for use in a laminated glass serving as a head-up display, the interlayer film has a region for display corresponding to a display region of the head-up display, the interlayer film includes an infrared reflective layer, a first resin layer containing a thermoplastic resin, and a second resin layer containing a thermoplastic resin, the first resin layer is arranged on a first surface side of the infrared reflective layer, the second resin layer is arranged on a second surface side opposite to the first
(Continued)

surface of the infrared reflective layer, at least one of the first resin layer and the second resin layer has a wedge angle of 0.1 mrad or more, and at least one of the first resin layer and the second resin layer contains a coloring agent in the region for display.

13 Claims, 2 Drawing Sheets

(51) Int. Cl.
| | |
|---|---|
| *B32B 17/10* | (2006.01) |
| *B32B 27/08* | (2006.01) |
| *B32B 27/30* | (2006.01) |
| *G02B 5/20* | (2006.01) |
| *G02B 5/26* | (2006.01) |

(52) U.S. Cl.
CPC .. *B32B 17/10036* (2013.01); *B32B 17/10651* (2013.01); *B32B 27/08* (2013.01); *B32B 27/30* (2013.01); *G02B 5/208* (2013.01); *G02B 5/26* (2013.01); *G02B 27/0101* (2013.01); *B32B 2307/4026* (2013.01); *B32B 2307/416* (2013.01); *B32B 2315/08* (2013.01); *B32B 2329/06* (2013.01); *B32B 2419/00* (2013.01); *B32B 2605/006* (2013.01); *B32B 2605/08* (2013.01)

(58) Field of Classification Search
CPC ........ B32B 17/10036; B32B 17/10651; B32B 27/08
See application file for complete search history.

(56) References Cited

U.S. PATENT DOCUMENTS

| | | |
|---|---|---|
| 2012/0164409 A1 | 6/2012 | Masaki |
| 2015/0168619 A1 | 6/2015 | Ohmoto et al. |
| 2015/0210043 A1 | 7/2015 | Ohmoto et al. |
| 2016/0263866 A1 | 9/2016 | Keller |
| 2017/0274630 A1 | 9/2017 | Oota et al. |
| 2017/0274631 A1 | 9/2017 | Oota et al. |
| 2018/0022066 A1 | 1/2018 | Iwamoto et al. |
| 2018/0022068 A1 | 1/2018 | Iwamoto et al. |
| 2018/0022071 A1 | 1/2018 | Iwamoto et al. |
| 2018/0029336 A1 | 2/2018 | Minakuchi et al. |
| 2018/0319130 A1 | 11/2018 | Nishino et al. |
| 2019/0061322 A1 | 2/2019 | Oota et al. |
| 2019/0202177 A1 | 7/2019 | Manz et al. |
| 2019/0255814 A1 | 8/2019 | Ohmoto et al. |
| 2020/0061977 A1 | 2/2020 | Minakuchi et al. |
| 2020/0079058 A1 | 3/2020 | Iwamoto et al. |

FOREIGN PATENT DOCUMENTS

| | | | |
|---|---|---|---|
| JP | 4-502525 A | 5/1992 | |
| JP | 2008-544878 A | 12/2008 | |
| JP | 2013-6730 A | 1/2013 | |
| JP | 2017-504550 A | 2/2017 | |
| JP | 2017-81775 A | 5/2017 | |
| JP | 2017-178781 A | 10/2017 | |
| JP | 2017-214276 A | 12/2017 | |
| KR | 10-2017-0063504 A | 6/2017 | |
| TW | 201634557 A | 10/2016 | |
| WO | WO-91/06031 A1 | 5/1991 | |
| WO | WO-2011/019062 A1 | 2/2011 | |
| WO | WO-2016052422 A1 * | 4/2016 | ....... B32B 17/10036 |
| WO | WO-2018/041472 A1 | 3/2018 | |

OTHER PUBLICATIONS

Written Opinion of the International Searching Authority (PCT/ISA/237) for Application No. PCT/JP2019/013952 dated Jun. 18, 2019 (English Translation mailed Oct. 8, 2020).
The First Office Action for the Application No. 201980023001.9 from The State Intellectual Property Office of the People's Republic of China dated Mar. 29, 2022.
Taiwanese Office Action for the Application No. 108111412 dated Jan. 7, 2023.
International Search Report for the Application No. PCT/JP2019/013952 dated Jun. 18, 2019.
Written Opinion of the International Searching Authority (PCT/ISA/237) for Application No. PCT/JP2019/013952 dated Jun. 18, 2019.
Supplementary European Search Report for the Application No. 19 777 042.3 dated Nov. 22, 2021.
Korean Office Action for the Application No. 10-2020-7025565 dated Feb. 22, 2024.

* cited by examiner

[FIG. 1]
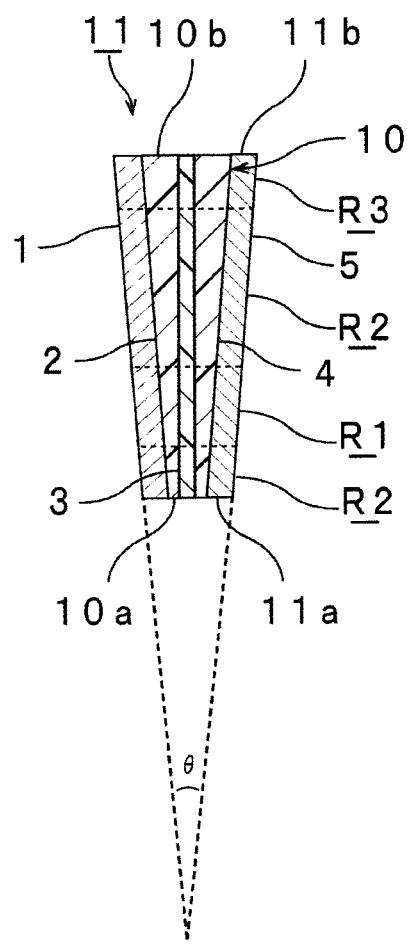
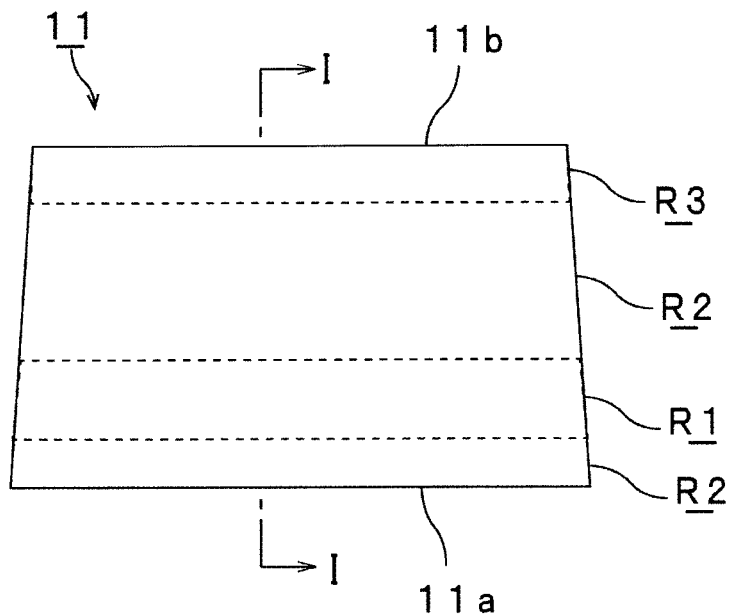

[FIG. 2]
(a)
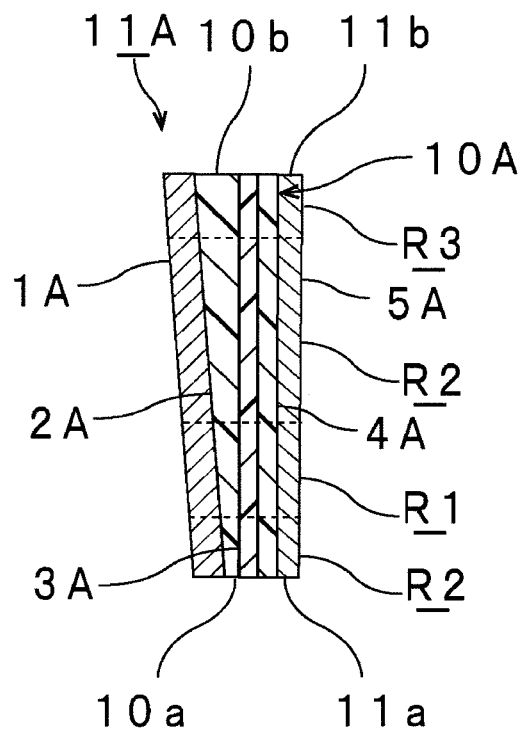
(b)
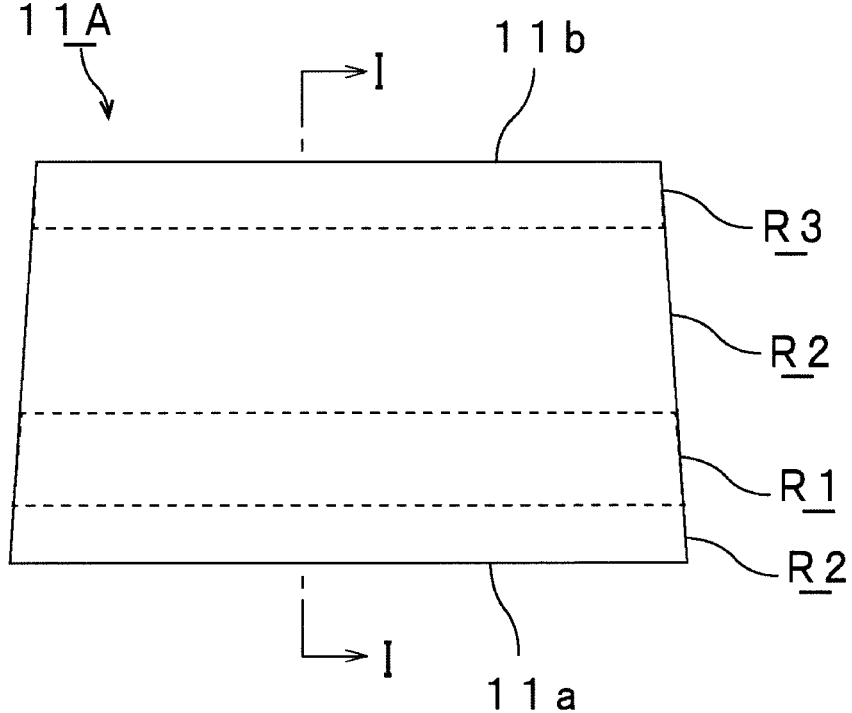

INTERMEDIATE FILM FOR LAMINATED GLASSES, LAMINATED GLASS, AND METHOD FOR MANUFACTURING HEAD UP DISPLAY SYSTEM

TECHNICAL FIELD

The present invention relates to an interlayer film for laminated glass, having an infrared reflective layer. Also, the present invention relates to a laminated glass including an interlayer film having an infrared reflective layer. Also, the present invention relates to a method for producing a head-up display system prepared with a laminated glass including an interlayer film having an infrared reflective layer.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. High heat shielding property is required for such a laminated glass used in openings of vehicles and buildings.

For enhancing the heat shielding property, an interlayer film having an infrared reflective layer is sometimes used. The interlayer film having an infrared reflective layer is disclosed in the following Patent Document 1.

Moreover, as a laminated glass used in automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like shaped interlayer film has been used. The following Patent Document 2 discloses a laminated glass in which a wedge-like shaped interlayer film having a prescribed wedge angle is sandwiched between a pair of glass plates. In such a laminated glass, by the adjustment of the wedge angle of the interlayer film, a display of measured information reflected by one glass plate and a display of measured information reflected by another glass plate can be focused into one point to make an image in the visual field of a driver. As such, the display of measured information is hard to be observed doubly and the visibility of a driver is hardly hindered.

RELATED ART DOCUMENTS

Patent Documents

Patent Document 1: JP 2017-81775 A
Patent Document 2: JP H4-502525 T

SUMMARY OF THE INVENTION

Problems to be Solved by the Invention

The interlayer film having an infrared reflective layer described in Patent Document 1 is not wedge-like. Also, a laminated glass prepared with the interlayer film is not wedge-like.

The interlayer film described in Patent Document 2 is wedge-like. In Patent Document 2, double images are suppressed by focusing a display of measured information reflected by one glass plate and a display of measured information reflected by another glass plate into one point to make an image in the visual field of a driver.

In a laminated glass using an interlayer film lacking an infrared reflective layer, multiple images can be suppressed relatively easily by adjusting the wedge angle of the interlayer film.

On the other hand, when the interlayer film having an infrared reflective layer is designed to have a wedge-like shape, and a laminated glass is prepared with the wedge-like shaped interlayer film, a display of measured information is generated also by reflection by the infrared reflective layer in the laminated glass. Therefore, it is sometimes the case that multiple images cannot be suppressed sufficiently only by adjustment of the wedge angle of the interlayer film.

It is an object of the present invention to provide an interlayer film for laminated glass, and a laminated glass capable of enhancing the heat shielding property, suppressing multiple images, and satisfactorily displaying an image. It is also an object of the present invention to provide a method for producing a head-up display system prepared with the aforementioned laminated glass.

Means for Solving the Problems

According to a broad aspect of the present invention, there is provided an interlayer film for laminated glass (hereinafter, sometimes described an interlayer film) for use in a laminated glass serving as a head-up display, the interlayer film having a region for display corresponding to a display region of the head-up display, the interlayer film including an infrared reflective layer, a first resin layer containing a thermoplastic resin, and a second resin layer containing a thermoplastic resin, the first resin layer being arranged on a first surface side of the infrared reflective layer, the second resin layer being arranged on a second surface side opposite to the first surface of the infrared reflective layer, at least one of the first resin layer and the second resin layer having a wedge angle of 0.1 mrad or more, at least one of the first resin layer and the second resin layer containing a coloring agent in the region for display.

In a specific aspect of the interlayer film according to the present invention, both of the first resin layer and the second resin layer have a wedge angle of 0.1 mrad or more.

In a specific aspect of the interlayer film according to the present invention, one of the first resin layer and the second resin layer has a wedge angle of 0.1 mrad or more, and the other of the first resin layer and the second resin layer has a wedge angle of less than 0.1 mrad.

In a specific aspect of the interlayer film according to the present invention, the resin layer having a wedge angle of less than 0.1 mrad contains the coloring agent.

In a specific aspect of the interlayer film according to the present invention, the coloring agent is a phthalocyanine compound, a naphthalocyanine compound, or an anthracyanine compound.

It is preferred that the thermoplastic resin in the first resin layer be a polyvinyl acetal resin. It is preferred that the thermoplastic resin in the second resin layer be a polyvinyl acetal resin.

It is preferred that the first resin layer contain a plasticizer. It is preferred that the second resin layer contain a plasticizer.

According to a broad aspect of the present invention, there is provided a laminated glass including a first lamination glass member, a second lamination glass member, and the above-described interlayer film for laminated glass, the first lamination glass member being arranged on an outer side of the first resin layer, the second lamination glass member being arranged on an outer side of the second resin layer.

According to a broad aspect of the present invention, there is provided a laminated glass serving as a head-up display, having a display region of the head-up display, the laminated glass including a first lamination glass member, a second lamination glass member, and an interlayer film, the interlayer film having a region for display corresponding to the display region of the head-up display, the interlayer film including an infrared reflective layer, a first resin layer containing a thermoplastic resin, and a second resin layer containing a thermoplastic resin, the first resin layer being arranged on a first surface side of the infrared reflective layer, the second resin layer being arranged on a second surface side opposite to the first surface of the infrared reflective layer, the first lamination glass member being arranged on an outer side of the first resin layer, the second lamination glass member being arranged on an outer side of the second resin layer, at least one of a first laminate of the first lamination glass member and the first resin layer, and a second laminate of the second resin layer and the second lamination glass member having a wedge angle of 0.1 mrad or more, at least one of the first resin layer and the second resin layer containing a coloring agent in the region for display. In the laminated glass, it is preferred that at least one of the first resin layer and the second resin layer have a wedge angle of 0.1 mrad or more.

In a specific aspect of the laminated glass according to the present invention, the laminated glass is a laminated glass that is to be attached to an opening between an exterior space, and an interior space to which a heat ray is incident from the exterior space in a vehicle, in such a manner that the first lamination glass member is situated on a side of the exterior space, and the second lamination glass member is situated on a side of the interior space, and the first resin layer has a wedge angle of 0.1 mrad or more.

In a specific aspect of the laminated glass according to the present invention, the laminated glass is a laminated glass that is to be attached to an opening between an exterior space, and an interior space to which a heat ray is incident from the exterior space in a vehicle, in such a manner that the first lamination glass member is situated on a side of the exterior space, and the second lamination glass member is situated on a side of the interior space, and the second resin layer contains a coloring agent in the region for display.

According to a broad aspect of the present invention, there is provided a method for producing a head-up display system including: in a building or vehicle having an opening between an exterior space, and an interior space to which a heat ray is incident from the exterior space, and a light source device for irradiating the laminated glass with light for image display, a step of attaching the above-described laminated glass to the opening in such a manner that the first lamination glass member is situated on a side of the exterior space, and the second lamination glass member is situated on a side of the interior space.

Effect of the Invention

The interlayer film for laminated glass according to the present invention is used in a laminated glass serving as a head-up display. The interlayer film for laminated glass according to the present invention has a region for display corresponding to a display region of the head-up display. The interlayer film for laminated glass according to the present invention includes an infrared reflective layer, a first resin layer containing a thermoplastic resin, and a second resin layer containing a thermoplastic resin. In the interlayer film for laminated glass according to the present invention, the first resin layer is arranged on a first surface side of the infrared reflective layer, and the second resin layer is arranged on a second surface side opposite to the first surface of the infrared reflective layer. In the interlayer film for laminated glass according to the present invention, at least one of the first resin layer and the second resin layer has a wedge angle of 0.1 mrad or more. In the interlayer film for laminated glass according to the present invention, at least one of the first resin layer and the second resin layer contains a coloring agent in the region for display. In the interlayer film for laminated glass according to the present invention, it is possible to enhance the heat shielding property, suppress multiple images, and satisfactorily display an image because the aforementioned configuration is provided.

The laminated glass according to the present invention is a head-up display. The laminated glass according to the present invention has a display region of the head-up display. Laminated glass according to the present invention includes a first lamination glass member, a second lamination glass member and an interlayer film. In the laminated glass according to the present invention, the interlayer film includes an infrared reflective layer, a first resin layer containing a thermoplastic resin, and a second resin layer containing a thermoplastic resin. In the laminated glass according to the present invention, the first resin layer is arranged on a first surface side of the infrared reflective layer, and the second resin layer is arranged on a second surface side opposite to the first surface of the infrared reflective layer. In the laminated glass according to the present invention, the first lamination glass member is arranged on an outer side of the first resin layer, and the second lamination glass member is arranged on an outer side of the second resin layer. In the laminated glass according to the present invention, at least one of a first laminate of the first lamination glass member and the first resin layer, and a second laminate of the second resin layer and the second lamination glass member has a wedge angle of 0.1 mrad or more. In the laminated glass according to the present invention, at least one of the first resin layer and the second resin layer contains a coloring agent in the region for display. In the laminated glass according to the present invention, it is possible to enhance the heat shielding property, suppress multiple images, and satisfactorily display an image because the aforementioned configuration is provided.

BRIEF DESCRIPTION OF DRAWINGS

FIGS. 1(a) and (b) are a sectional view and a front view, respectively, schematically showing a laminated glass having an interlayer film for laminated glass, in accordance with a first embodiment of the present invention.

FIGS. 2(a) and (b) are a sectional view and a front view, respectively, schematically showing a laminated glass having an interlayer film for laminated glass, in accordance with a second embodiment of the present invention.

MODES FOR CARRYING OUT THE INVENTION

Hereinafter, the details of the present invention will be described.

An interlayer film for laminated glass according to the present invention (hereinafter, sometimes described as an interlayer film) is used in a laminated glass serving as a head-up display. The interlayer film according to the present invention is an interlayer film that can be used in a laminated glass serving as a head-up display. The interlayer film according to the present invention has a region for display corresponding to a display region of the head-up display. The interlayer film according to the present invention includes an infrared reflective layer, a first resin layer containing a thermoplastic resin, and a second resin layer containing a thermoplastic resin. In the interlayer film according to the present invention, the first resin layer is arranged on a first surface side of the infrared reflective layer, and the second resin layer is arranged on a second surface side opposite to the first surface of the infrared reflective layer. In the interlayer film according to the present invention, at least one of the first resin layer and the second resin layer has a wedge angle of 0.1 mrad or more. In the interlayer film for laminated glass according to the present invention, at least one of the first resin layer and the second resin layer contains a coloring agent.

In the interlayer film according to the present invention, it is possible to enhance the heat shielding property, suppress multiple images, and satisfactorily display an image because the aforementioned configuration is provided. The present inventors made efforts to achieve both improvement in heat shielding property and suppression of multiple images, and found that these can be achieved by adjusting a wedge angle of a resin layer, and containing a coloring agent in a resin layer in an interlayer film having an infrared reflective layer.

The laminated glass according to the present invention is a head-up display. The laminated glass according to the present invention has a display region of the head-up display. Laminated glass according to the present invention includes a first lamination glass member, a second lamination glass member and an interlayer film. In the laminated glass according to the present invention, the interlayer film includes an infrared reflective layer, a first resin layer containing a thermoplastic resin, and a second resin layer containing a thermoplastic resin. In the laminated glass according to the present invention, the first resin layer is arranged on a first surface side of the infrared reflective layer, and the second resin layer is arranged on a second surface side opposite to the first surface of the infrared reflective layer. In the laminated glass according to the present invention, the first lamination glass member is arranged on an outer side of the first resin layer, and the second lamination glass member is arranged on an outer side of the second resin layer. In the laminated glass according to the present invention, at least one of a first laminate of the first lamination glass member and the first resin layer, and a second laminate of the second resin layer and the second lamination glass member has a wedge angle of 0.1 mrad or more. In the laminated glass according to the present invention, at least one of the first resin layer and the second resin layer contains a coloring agent in the region for display.

In the laminated glass according to the present invention, it is possible to enhance the heat shielding property, suppress multiple images, and satisfactorily display an image because the aforementioned configuration is provided. The present inventors made efforts to achieve both improvement in heat shielding property and suppression of multiple images, and found that these can be achieved by adjusting a wedge angle of a laminate of a lamination glass member and a resin layer, and containing a coloring agent in a resin layer in a laminated glass prepared with an interlayer film having an infrared reflective layer.

The infrared reflective layer effectively enhances the heat shielding property. In a laminated glass prepared with an interlayer film having an infrared reflective layer, a display of measured information is generated also by reflection by the infrared reflective layer. It is sometimes the case that multiple images cannot be sufficiently suppressed depending on the configuration of the resin layer when the infrared reflective layer is used. In the present invention, since at least one of the first resin layer and the second resin layer has a wedge angle of 0.1 mrad or more, and at least one of the first resin layer and the second resin layer contains a coloring agent, it is possible to suppress multiple images. Multiple images can be suppressed also by making at least one of the first laminate and the second laminate have a wedge angle of 0.1 mrad or more, and making at least one of the first resin layer and the second resin layer contain a coloring agent.

It is preferred that at least one of the first resin layer and the second resin layer have a wedge angle of 0.1 mrad or more. When the first resin layer is wedge-like, the second resin layer may be rectangular. When the second resin layer is wedge-like, the first resin layer may be rectangular. The wedge angle of the first resin layer may be 0 mrad, or may be more than 0 mrad, and is preferably 0.1 mrad or more. When the wedge angle is 0 mrad, the first resin layer is not wedge-like. The wedge angle of the second resin layer may be 0 mrad, may be more than 0 mrad, or may be less than 0.1 mrad, and is preferably 0.1 mrad or more. When the wedge angle is 0 mrad, the second resin layer is not wedge-like.

A bilayer in which the first lamination glass member and the first resin layer are layered is called a first laminate. A bilayer in which the second resin layer and the second lamination glass member are layered is called a second laminate. It is preferred that at least one of the first laminate and the second laminate have a wedge angle of 0.1 mrad or more. When the first laminate is wedge-like, the second laminate may be rectangular. When the second laminate is wedge-like, the first laminate may be rectangular. When the first laminate is wedge-like, the first resin layer may be wedge-like, the first lamination glass member may be wedge-like, or the first resin layer and the first lamination glass member may be wedge-like. When the second laminate is wedge-like, the second resin layer may be wedge-like, the second lamination glass member may be wedge-like, or the second resin layer and the second lamination glass member may be wedge-like. The wedge angle of the first laminate may be 0 mrad, may be more than 0 mrad, or may be less than 0.1 mrad, and is preferably 0.1 mrad or more. When the wedge angle is 0 mrad, the first laminate is not wedge-like. The wedge angle of the second laminate may be 0 mrad, may be more than 0 mrad, or may be less than 0.1 mrad, and is preferably 0.1 mrad or more. When the wedge angle is 0 mrad, the second laminate is not wedge-like.

It is preferred that the interlayer film have a wedge angle of 0.1 mrad or more. It is preferred that the laminated glass have a wedge angle of 0.1 mrad or more.

From the viewpoint of further ameliorating multiple images, it is preferred that both the first resin layer and the second resin layer be wedge-like. It is sometimes the case that either one of the first resin layer and the second resin layer contains a heat shielding substance. In this case, from the viewpoint of further ameliorating the in-plane transmittance and unevenness in color tone, it is preferred that the resin layer containing a heat shielding substance have a wedge angle of less than 0.1 mrad, and the resin layer free of a heat shielding substance have a wedge angle of 0.1 mrad or more. It is sometimes the case that both of the first resin layer and the second resin layer contain a heat shielding substance, and contents of the heat shielding substances differ between the first resin layer and the second resin layer. In this case, from the viewpoint of further ameliorating the in-plane transmittance and unevenness in color tone, it is preferred that the resin layer containing a larger amount of a heat shielding substance have a wedge angle of less than 0.1 mrad, and the resin layer containing a smaller amount of a heat shielding substance have a wedge angle of 0.1 mrad or more. The wedge angle of the resin layer having a wedge angle of less than 0.1 mrad may be 0 mrad, or may be more than 0 mrad.

From the viewpoint of further suppressing multiple images, the wedge angle of each of the first resin layer, the second resin layer, the first laminate, the second laminate, the interlayer film and the laminated glass is preferably 0.2 mrad (0.0115 degrees) or more. When the wedge angle is the above lower limit or more, it is possible to obtain a laminated glass suited for cars such as a truck or a bus in which the attachment angle of the windshield is large.

The wedge angle of each of the first resin layer, the second resin layer, the first laminate, the second laminate, the interlayer film, and the laminated glass is preferably 2 mrad (0.1146 degrees) or less, more preferably 0.7 mrad (0.0401 degrees) or less, further preferably 0.5 mrad (0.0288 degrees) or less, and especially preferably 0.47 mrad (0.027 degrees) or less. When the wedge angle is the above upper limit or less, multiple images are further suppressed. When the wedge angle is the above upper limit or less, it is possible to obtain a laminated glass suited for cars such as a sports car in which the attachment angle of the windshield is small.

The wedge angle (θ in FIG. 1) of the interlayer film is an interior angle formed at the intersection point between a straight line connecting a point on the first surface (one surface) of the maximum thickness part of the interlayer film and a point on the first surface of the minimum thickness part thereof and a straight line connecting a point on the second surface (the other surface) of the maximum thickness part of the interlayer film and a point on the second surface of the minimum thickness part thereof. When there are a plurality of maximum thickness parts, there are a plurality of minimum thickness parts, the maximum thickness part is located in a certain region, or the minimum thickness part is located in a certain region, the maximum thickness part and the minimum thickness part for determining the wedge angle are selected so that the wedge angle to be determined is the maximum.

Wedge angles of the first resin layer, the second resin layer, the first laminate, the second laminate and the laminated glass can be determined in the same manner as the wedge angle of the interlayer film.

The interlayer film may be wound into a roll shape to form a roll body of the interlayer film. The roll body may be provided with a winding core and the interlayer film. The interlayer film may be wound around an outer periphery of the winding core.

Hereinafter, specific embodiments of the present invention will be described with reference to the drawings.

FIGS. 1(a) and (b) are a sectional view and a front view, respectively, schematically showing a laminated glass prepared with an interlayer film for laminated glass, in accordance with a first embodiment of the present invention. FIG. 1(a) is a sectional view along the line I-I in FIG. 1(b). In FIG. 1(a), FIG. 1(b) and later-described drawings, for convenience of illustration, the thickness of the laminated glass and the thickness of each member constituting the laminated glass, and the wedge angle (θ) are shown differently from actual thicknesses and wedge angle. In FIG. 1(a), FIG. 1(b) and later-described drawings, different points are replaceable.

FIG. 1(a) and FIG. 1(b) show a laminated glass 11. In FIG. 1(a), a section in the thickness direction of the laminated glass 11 is shown.

The laminated glass 11 has one end 11a and the other end 11b at the opposite side of the one end 11a. The one end 11a and the other end 11b are end parts of both sides facing each other. The thickness of the other end 11b of the laminated glass 11 is larger than the thickness of the one end 11a thereof. Accordingly, the laminated glass 11 has a region being thin in thickness and a region being thick in thickness. The one end 11a can also be called a lower end of the laminated glass, and the other end 11b can also be called an upper end of the laminated glass.

The laminated glass 11 is a head-up display. The laminated glass 11 has a display region R1 of the head-up display.

The laminated glass 11 has a surrounding region R2 neighboring the display region R1.

The laminated glass 11 has a shading region R3 that is apart from the display region R1. The shading region R3 is located in an edge portion of the laminated glass 11.

The laminated glass 11 shown in FIG. 1(a) and FIG. 1(b) includes a first lamination glass member 1, a first resin layer 2, an infrared reflective layer 3, a second resin layer 4, and a second lamination glass member 5. The first lamination glass member 1, the first resin layer 2, the infrared reflective layer 3, the second resin layer 4, and the second lamination glass member 5 are arranged side by side in this order.

A laminate of the first resin layer 2, the infrared reflective layer 3, and the second resin layer 4 is an interlayer film 10 (interlayer film for laminated glass). The interlayer film 10 is arranged between the first lamination glass member 1 and the second lamination glass member 5.

The interlayer film 10 has a region for display corresponding to the display region R1.

The interlayer film 10 has one end 10a and the other end 10b at the opposite side of the one end 10a. The one end 10a and the other end 10b are end parts of both sides facing each other. The thickness of the other end 10b of the interlayer film 10 is larger than the thickness of the one end 10a. Accordingly, the interlayer film 10 has a region being thin in thickness and a region being thick in thickness.

The first resin layer 2 and the second resin layer 4 are wedge-like. The first lamination glass member 1, the infrared reflective layer 3, and the second lamination glass member 5 are rectangular. In each wedge-like member, the sectional shape in the thickness direction of each member is a wedge-like shape. In each rectangular member, the sectional shape in the thickness direction of each member is a rectangular shape. A first laminate of the first lamination glass member 1 and the first resin layer 2 is wedge-like. A second laminate of the second resin layer 4 and the second lamination glass member 5 is wedge-like.

In the present embodiment, the first resin layer 2 has a wedge angle of 0.1 mrad or more. In the present embodiment, the second resin layer 4 has a wedge angle of 0.1 mrad or more.

FIGS. 2(a) and (b) are a sectional view and a front view, respectively, schematically showing a laminated glass, in accordance with a second embodiment of the present invention. FIG. 2(a) is a sectional view along the line I-I in FIG. 2(b).

FIG. 2(a) and FIG. 2(b) show a laminated glass 11A. FIG. 2(a) shows a section in the thickness direction of the laminated glass 11A.

The laminated glass 11A has one end 11a and the other end 11b at the opposite side of the one end 11a. The thickness of the other end 11b of the laminated glass 11A is larger than the thickness of the one end 11a thereof. Accordingly, the laminated glass 11A has a region being thin in thickness and a region being thick in thickness.

The laminated glass 11A is a head-up display. The laminated glass 11A has a display region R1 of a head-up display.

The laminated glass 11A has a surrounding region R2 neighboring the display region R1.

The laminated glass 11A has a shading region R3 that is apart from the display region R1. The shading region R3 is located in an edge portion of the laminated glass 11A.

The laminated glass 11A includes a first lamination glass member 1A, a first resin layer 2A, an infrared reflective layer 3A, a second resin layer 4A, and a second lamination glass member 5A. The first lamination glass member 1A, the first resin layer 2A, the infrared reflective layer 3A, the second resin layer 4A, and the second lamination glass member 5A are arranged side by side in this order.

A laminate of the first resin layer 2A, the infrared reflective layer 3A, and the second resin layer 4A is an interlayer film 10A (interlayer film for laminated glass). The interlayer film 10A is arranged between the first lamination glass member 1A and the second lamination glass member 5A.

The interlayer film 10A has a region for display corresponding to the display region R1.

The interlayer film 10A has one end 10a and the other end 10b at the opposite side of the one end 10a. The one end 10a and the other end 10b are end parts of both sides facing each other. The thickness of the other end 10b of the interlayer film 10A is larger than the thickness of the one end 10a thereof. Accordingly, the interlayer film 10A has a region being thin in thickness and a region being thick in thickness.

The first resin layer 2A is wedge-like. The first lamination glass member 1A, the infrared reflective layer 3A, the second resin layer 4A, and the second lamination glass member 5A are rectangular. A first laminate of the first lamination glass member 1A and the first resin layer 2A is wedge-like. A second laminate of the second resin layer 4A, and the second lamination glass member 5A is rectangular.

In the present embodiment, the first resin layer 2A has a wedge angle of 0.1 mrad or more.

The laminated glass 11, 11A has a maximum thickness at the other end 11b and a minimum thickness at the one end 11a. The interlayer film 10, 10A has a maximum thickness at the other end 10b and a minimum thickness at the one end 10a.

The interlayer film and the laminated glass have one end and the other end being at the opposite side of the one end. The one end and the other end are end parts of both sides facing each other in the interlayer film and the laminated glass. It is preferred that the thickness of the other end be larger than the thickness of the one end in the laminated glass according to the present invention.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

From the viewpoint of suppressing the multiple images more effectively, it is preferred that the interlayer film and the laminated glass have the region for display and the display region within a region between a position of 6 cm from the one end toward the other end and a position of 63.8 cm from the one end toward the other end. As already described, since the one end 11a can also be called a lower end of the laminated glass, and the other end 11b can also be called an upper end of the laminated glass, it can be mentioned that the interlayer film and the laminated glass preferably have the region for display and the display region within a region between a position of 6 cm from the lower end toward the upper end and a position of 63.8 cm from the lower end toward the upper end. The region for display and the display region may exist in a part or the whole of the region from a position of 6 cm from the one end toward the other end to a position of 63.8 cm from the one end toward the other end.

It is preferred that the interlayer film and the laminated glass have a portion with a sectional shape in the thickness direction of a wedge-like shape. It is preferred that the sectional shape in the thickness direction of the region for display and the display region be a wedge-like shape.

From the viewpoint of suppressing the multiple images effectively, it is preferred that the interlayer film and the laminated glass have a portion with a sectional shape in the thickness direction of a wedge-like shape in the region between a position of 6 cm toward the other end from the one end and a position of 63.8 cm toward the other end from the one end. The portion with a sectional shape in the thickness direction of a wedge-like shape may exist in a part or the whole of the region to the position of 63.8 mm from the one end toward the other end.

The interlayer film and the laminated glass may have a shading region. The shading region may be apart from the region for display and the display region. From the viewpoint of effectively suppressing multiple images, it is preferred that the interlayer film and the laminated glass do not have a shading region, or when they have a shading region, it is preferred that the shading region be apart from the region for display and the display region. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film and the laminated glass. It is preferred that the shading region be belt-shaped.

In the shading region, a coloring agent or a filler may be used so as to change the color and the visible light transmittance. The coloring agent or the filler may be contained in a partial region in the thickness direction of the interlayer film and the laminated glass or may be contained in the entire region in the thickness direction of the interlayer film and the laminated glass.

From the viewpoint of effectively suppressing multiple images, at least one of the first resin layer and the second resin layer contain the coloring agent in a region different from the shading region.

From the viewpoint of further improving the display, and further extending the visual field, the visible light transmittance of the region for display and the display region is preferably 70% or more, preferably 74% or more, more preferably 75% or more, still more preferably 78% or more, further preferably 80% or more, further preferably 85% or more, especially preferably 88% or more, and most preferably 90% or more. It is preferred that the visible light transmittance of the region for display and the display region be higher than the visible light transmittance of the shading region. The visible light transmittance of the region for display and the display region may be lower than the visible light transmittance of the shading region. The visible light transmittance of the display region is higher than the visible light transmittance of the shading region preferably by 50% or more, more preferably by 60% or more.

When the visible light transmittance varies in the region for display, the display region and the shading region, for example, the visible light transmittance is measured at the center position of the region for display and the display region, and at the center position of the shading region.

The visible light transmittance at a wavelength ranging from 380 nm to 780 nm of a laminated glass can be measured by using a spectrophotometer ("U-4100" available from Hitachi High-Tech Science Corporation) in conformity with JIS R3211:1998. As the glass plate, it is preferred to use clear glass having a thickness of 2 mm.

It is preferred that the region for display and the display region have a length direction and a width direction. For excellent versatility of the laminated glass, it is preferred that the width direction of the region for display and the display region be the direction connecting the one end and the other end. It is preferred that the region for display and the display region be belt-shaped.

It is preferred that each of the first resin layer and the second resin layer have a MD direction and a TD direction. The first resin layer and the second resin layer are obtained, for example, by melt extrusion molding. The MD direction is a machine direction of the resin layer at the time of production of the first resin layer and the second resin layer. The TD direction is a direction perpendicular to the machine direction of the first resin layer and the second resin layer at the time of production of the first resin layer and the second resin layer, and is a direction perpendicular to the thickness direction of the first resin layer and the second resin layer. It is preferred that the one end and the other end be located on either side of the TD direction.

A distance between the one end and the other end is defined as X. It is preferred that the interlayer film and the laminated glass have a minimum thickness in the region at a distance of 0X to 0.2X inwardly from the one end, and a maximum thickness in the region at a distance of 0X to 0.2X inwardly from the other end. It is more preferred that the interlayer film and the laminated glass have a minimum thickness in the region at a distance of 0X to 0.1X inwardly from the one end, and a maximum thickness in the region at a distance of 0X to 0.1X inwardly from the other end. It is preferred that the interlayer film and the laminated glass have a minimum thickness at the one end and the interlayer film and the laminated glass have a maximum thickness at the other end.

The interlayer film and the laminated glass may have a uniform-thickness part. The uniform-thickness part means that the variation in thickness does not exceed 10 μm per a distance range of 10 cm in the direction connecting one end and the other end of the interlayer film and the laminated glass. Therefore, the uniform-thickness part refers to the part in which the variation in thickness does not exceed 10 μm per a distance range of 10 cm in the direction connecting the one end and the other end of the interlayer film and the laminated glass. To be more specific, the uniform-thickness part refers to the part where the thickness does not vary at all in the direction connecting the one end and the other end of the interlayer film and the laminated glass, or the thickness varies by 10 μm or less per a distance range of 10 cm in the direction connecting the one end and the other end of the interlayer film and the laminated glass.

The distance X between one end and the other end of the interlayer film and the laminated glass is preferably 3 m or less, more preferably 2 m or less, especially preferably 1.5 m or less, and preferably 0.5 m or more, more preferably 0.8 m or more, and especially preferably 1 m or more.

It is preferred that the laminated glass be to be attached to an opening between an exterior space, and an interior space to which a heat ray is incident from the exterior space in a vehicle, in such a manner that the first lamination glass member is situated on a side of the exterior space, and the second lamination glass member is situated on a side of the interior space.

Hereinafter, other details of members constituting the interlayer film and the laminated glass according to the present invention are described.

(Infrared Reflective Layer)

The infrared reflective layer reflects infrared rays. The infrared reflective layer is not particularly limited as long as it has the property of reflecting infrared rays.

Examples of the infrared reflective layer include a resin film with metal foil, a multilayer laminate film in which a metal layer and a dielectric layer are formed on a resin layer, a film containing graphite, a multilayer resin film, and a liquid crystal film. These films have the property of reflecting infrared rays.

It is preferred that the infrared reflective layer be a resin film with metal foil, a film containing graphite, a multilayer resin film, or a liquid crystal film. These films are significantly excellent in the infrared reflecting property. Therefore, by using these films, it is possible to obtain a laminated glass having still higher heat shielding property, and capable of keeping the high visible light transmittance for a still longer term.

The resin film with metal foil includes a resin film, and a metal foil layered on the outer surface of the resin film. Examples of the material of the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material of the metal foil include aluminum, copper, silver, gold, palladium, and alloys containing these metals.

The multilayer laminate film in which a metal layer and a dielectric layer are formed on a resin layer is a multilayer laminate film in which any number of layers of the metal layer and the dielectric layer are alternately layered. In the multilayer laminate film in which a metal layer and a dielectric layer are formed on a resin layer, it is preferred that all of the metal layers and the dielectric layers be layered alternately, however, there may be a structural part in which a metal layer and a dielectric layer are not layered alternately as exemplified by metal layer/dielectric layer/metal layer/dielectric layer/metal layer/metal layer/dielectric layer/metal layer.

As the material of the resin layer (resin film) in the multilayer laminate film, those exemplified as the material of the resin film in the resin film with metal foil can be exemplified. Examples of the material of the resin layer (resin film) in the multilayer laminate film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamide such as nylon 6, 11, 12, 66 and the like, polystyrene, polycarbonate, polyethylene terephthalate, polyethylene naphthalate, polyester, polyphenylene sulfide, and polyether imide. As the material of the metal layer in the multilayer laminate film, those exemplified as the material of the metal foil in the resin film with metal foil can be exemplified. A coating layer of metal or a mixed oxide of metal can be given to the both faces or either face of the metal layer. Examples of the material of the coating layer include ZnO, $Al_2O_3$, $Ga_2O_3$, $InO_3$, MgO, Ti, NiCr and Cu.

Examples of the dielectric layer in the multilayer laminate film include indium oxide.

The multilayer resin film is a laminate film in which a plurality of resin films are layered. As the material of the multilayer resin film, those exemplified as the material of the resin layer (resin film) in the multilayer laminate film can be exemplified. The number of layered resin films in the multilayer resin film is 2 or more, and may be 3 or more, and may be 5 or more. The number of layered resin films in the multilayer resin film may be 1000 or less, and may be 100 or less, and may be 50 or less.

The multilayer resin film may be a multilayer resin film in which any number of layers of two or more kinds of thermoplastic resin films having different optical properties (refractive index) are layered alternately or randomly. Such a multilayer resin film is so configured that a desired infrared reflecting property is obtained.

As the liquid crystal film, a film in which any number of layers of cholesteric liquid crystal layers that reflect the light of any wavelength are layered can be recited. Such a liquid crystal film is so configured that desired infrared reflecting property is obtained.

For excellent performance of reflecting infrared rays, it is preferred that the infrared reflective layer have such a property that the infrared transmittance is 40% or less at at least one wavelength within the range of 800 nm to 2000 nm. The infrared transmittance of the infrared reflective layer used in the later-described example satisfies the aforementioned preferred requirement. At at least one wavelength within the range of 800 nm to 2000 nm, the infrared transmittance is preferably 30% or less, and further preferably 20% or less.

Transmittance at each wavelength within the wavelength range of 800 nm to 2000 nm of the infrared reflective layer is specifically measured in the following manner. A single infrared reflective layer is prepared. Spectral transmittance at each wavelength within the wavelength of 800 nm to 2000 nm of the infrared reflective layer is obtained by using a spectrophotometer ("U-4100" available from Hitachi High-Tech Science Corporation) in conformity with JIS R3106: 1998 or JIS R3107:2013. It is preferred that spectral transmittance at each wavelength within the wavelength of 800 nm to 2000 nm of the infrared reflective layer be obtained in conformity with JIS R3107:2013.

(First Resin Layer and Second Resin Layer)

Thermoplastic Resin:

The first resin layer contains a thermoplastic resin (hereinafter, sometimes described as a thermoplastic resin (1)). It is preferred that the first resin layer contain a polyvinyl acetal resin (hereinafter, sometimes described as a polyvinyl acetal resin (1)) as the thermoplastic resin (1). The second resin layer contains a thermoplastic resin (hereinafter, sometimes described as a thermoplastic resin (2)). It is preferred that the second resin layer contain a polyvinyl acetal resin (hereinafter, sometimes described as a polyvinyl acetal resin (2)) as the thermoplastic resin (2).

The thermoplastic resin (1) and the thermoplastic resin (2) may be the same as or different from each other. One kind of each of the thermoplastic resin (1) and the thermoplastic resin (2) may be used alone, and two or more kinds thereof may be used in combination. One kind of each of the polyvinyl acetal resin (1) and the polyvinyl acetal resin (2) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl acetate resin, a polystyrene resin, and an ionomer resin. Thermoplastic resins other than these may be used.

It is preferred that the thermoplastic resin be a polyvinyl acetal resin. By using a polyvinyl acetal resin and a plasticizer together, the adhesive force of the resin layer to other layer such as a lamination glass member or an infrared reflective layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of a resin layer is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the resin layer is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

A content of the hydroxyl group (the amount of hydroxyl groups) of the polyvinyl acetal resin is preferably 15% by mole or more, more preferably 18% by mole or more, further preferably 20% by mole or more, and especially preferably 28% by mole or more, and is preferably 40% by mole or less, more preferably 35% by mole or less, and further preferably 32% by mole or less. When the content of the hydroxyl group is the above lower limit or more, the adhesive force of the resin layer further increases. Moreover, when the content of the hydroxyl group is the above upper limit or less, the flexibility of the resin layer is enhanced and the handling of the resin layer is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree (the amount of acetyl groups) of the polyvinyl acetal resin is preferably 0.1% by mole or more, more preferably 0.3% by mole or more, further preferably 0.5% by mole or more and is preferably 30% by mole or less, more preferably 25% by mole or less, further preferably 20% by mole or less, especially preferably 15% by mole or less, most preferably 3% by more or less. When the acetylation degree is the above lower limit or more, the compatibility between the polyvinyl acetal resin and a plasticizer is enhanced. When the acetylation degree is the above upper limit or less, the moisture resistance of the laminated glass is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 60% by mole or more, more preferably 63% by mole or more, and preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

Plasticizer:

From the viewpoint of further enhancing the adhesive force of the resin layer, it is preferred that the first resin layer contain a plasticizer (hereinafter, sometimes described as a plasticizer (1)). From the viewpoint of further enhancing the adhesive force of the resin layer, it is preferred that the second resin layer contain a plasticizer (hereinafter, sometimes described as a plasticizer (2)). It is especially preferred that a resin layer contain a plasticizer when the thermoplastic resin contained in the resin layer is a polyvinyl acetal resin. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

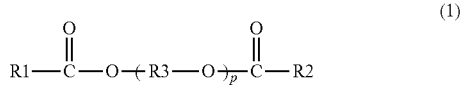

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer is not particularly limited. In the layer containing a plasticizer (the first resin layer, or the second resin layer), the content of the plasticizer is preferably 25 parts by weight or more, more preferably 30 parts by weight or more, and further preferably 35 parts by weight or more per 100 parts by weight of the thermoplastic resin. In the layer containing a plasticizer (the first resin layer, or the second resin layer), the content of the plasticizer is preferably 75 parts by weight or less, more preferably 60 parts by weight or less, further preferably 50 parts by weight or less, and especially preferably 40 parts by weight or less per 100 parts by weight of the thermoplastic resin. When the content of the plasticizer is the above lower limit or more, the penetration resistance of laminated glass is further enhanced. When the content of the plasticizer is the above upper limit or less, the transparency of laminated glass is further enhanced.

Coloring Agent:

It is preferred that the first resin layer contain a coloring agent (hereinafter, sometimes described as a coloring agent (1) in the region for display. It is preferred that the second resin layer contain a coloring agent (hereinafter, sometimes described as a coloring agent (2) in the region for display. Of the first resin and the second resin layer, the first resin layer may contain the coloring agent (1) in the region for display. It is preferred that the first resin layer contain the coloring agent (1) in the region for display, and the second resin layer contain the coloring agent (2) in the region for display. One kind of the coloring agent may be used alone and two or more kinds thereof may be used in combination.

From the viewpoint of effectively suppressing multiple images in the entire laminated glass, it is preferred that the resin layer having a wedge angle of less than 0.1 mrad contain a coloring agent.

From the viewpoint of further suppressing multiple images, the maximum absorption wavelength of the coloring agent is preferably 380 nm or more, more preferably 500 nm or more, further preferably 600 nm, and is preferably 780 nm or less.

The maximum absorption wavelength means the wavelength at which the absorbance of the coloring agent peaks.

Examples of the coloring agent include a pigment, a dye and the like.

The pigment and the dye are discriminated from each other in the following manner.

One hundred parts by weight of a polyvinyl butyral resin (using n-butyl aldehyde, polymerization degree of polyvinyl alcohol of 1700, content of hydroxyl group of 30% by mole, acetylation degree of 1% by mole, butyralization degree of 69% by mole), 40 parts by weight of triethyleneglycol di-2-ethylhexanoate (3GO), and a coloring agent in an amount of 0.015 parts by weight per 100% by weight of the total amount of the polyvinyl butyral resin, 3GO, and the coloring agent are kneaded to obtain a kneaded product. The kneaded product is extruded to obtain a resin film having a thickness of 760 μm. The resin film is arranged between two sheets of clear glass (2.5 mm in thickness) having a visible light transmittance of 90% measured in conformity with JIS R3106:1998 to prepare a laminated glass. The coloring agent that gives a laminated glass having a haze value of 0.35% or more is defined as a pigment. The coloring agent that gives a haze value of less than 0.35% is defined as a dye.

The pigment may be an organic pigment or may be an inorganic pigment. The organic pigment may be an organic pigment having a metal atom, or may be an organic pigment free of a metal atom. One kind of the pigment may be used alone, and two or more kinds thereof may be used in combination.

Examples of the organic pigment include a phthalocyanine compound, a quinacridone compound, an azo compound, a pentaphene compound, a dioxazine compound, a perylene compound, an indole compound and a dioxazine compound.

Examples of the inorganic pigment include carbon black, and iron oxide, zinc oxide and titanium oxide.

It is preferred that the coloring agent be a phthalocyanine compound, a naphthalocyanine compound, an anthracyanine compound, a quinacridone compound, an azo compound, a pentaphene compound, a dioxazine compound, a perylene compound, an indole compound or carbon black.

It is preferred that the coloring agent be at least one kind of Ingredient X among a phthalocyanine compound, a naphthalocyanine compound, and an anthracyanine compound.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further suppressing multiple images, and further enhancing the heat shielding property in the laminated glass, it is preferred that the Ingredient X be phthalocyanine, a derivative of phthalocyanine, naphthalocyanine or a derivative of naphthalocyanine, and it is more preferred that the Ingredient X be phthalocyanine or a derivative of phthalocyanine.

From the viewpoints of further suppressing multiple images, and effectively enhancing the heat shielding property and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further suppressing multiple images, and still further enhancing the heat shielding property in the laminated glass, it is preferred that the Ingredient X have a structural unit in which an oxygen atom is bonded to a vanadium atom.

From the viewpoint of further suppressing multiple images, it is preferred that the content of the coloring agent and the content of the Ingredient X satisfy the following preferred ranges.

In 100% by weight of the layer containing a coloring agent (the first resin layer or the second resin layer), the content of the coloring agent is preferably 0.00001% by weight or more, more preferably 0.0001% by weight or more, further preferably 0.001% by weight or more, especially preferably 0.01% by weight or more, most preferably 0.02% by weight or more. In 100% by weight of the layer containing a coloring agent (the first resin layer or the second resin layer), the content of the coloring agent is preferably 0.2% by weight or less, more preferably 0.1% by weight or less, further preferably 0.05% by weight or less, especially preferably 0.04% by weight or less. When the content of the coloring agent is the above lower limit or more and the above upper limit or less, multiple images are effectively suppressed.

In 100% by weight of the region containing a coloring agent in the region for display of the layer containing a coloring agent (the first resin layer or the second resin layer), the content of the coloring agent is preferably 0.00001% by weight or more, more preferably 0.0001% by weight or more, further preferably 0.001% by weight or more, especially preferably 0.01% by weight or more, most preferably 0.02% by weight or more. In 100% by weight of the region containing a coloring agent in the region for display of the layer containing a coloring agent (the first resin layer or the second resin layer), the content of the coloring agent is preferably 0.2% by weight or less, more preferably 0.1% by weight or less, further preferably 0.05% by weight or less, especially preferably 0.04% by weight or less. When the content of the coloring agent is the above lower limit or more and the above upper limit or less, multiple images are effectively suppressed.

In 100% by weight of the layer containing Ingredient X (the first resin layer or the second resin layer), the content of the Ingredient X is preferably 0.00001% by weight or more, more preferably 0.0001% by weight or more, further preferably 0.001% by weight or more, especially preferably 0.01% by weight or more, most preferably 0.02% by weight or more. In 100% by weight of the layer containing Ingredient X (the first resin layer or the second resin layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, multiple images are effectively suppressed.

In 100% by weight of the region containing Ingredient X in the region for display of the layer containing Ingredient X (the first resin layer or the second resin layer), the content of the Ingredient X is preferably 0.00001% by weight or more, more preferably 0.0001% by weight or more, further preferably 0.001% by weight or more, especially preferably 0.01% by weight or more, most preferably 0.02% by weight or more. In 100% by weight of the region containing Ingredient X in the region for display of the layer containing Ingredient X (the first resin layer or the second resin layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, multiple images are effectively suppressed.

Heat Shielding Substance:

It is preferred that the first resin layer contain a heat shielding substance. The first resin layer need not contain a heat shielding substance. The content of the heat shielding substance in the first resin layer may be smaller than the content of the heat shielding substance in the second resin layer. It is preferred that the second resin layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles.

It is preferred that the first resin layer contain at least one kind of Ingredient X among a phthalocyanine compound, a naphthalocyanine compound, and an anthracyanine compound. The first resin layer need not contain the Ingredient X. The content of the Ingredient X in the first resin layer may be smaller than the content of the Ingredient X in the second resin layer. It is preferred that the second resin layer contain the Ingredient X. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property of the laminated glass, it is preferred that the Ingredient X be phthalocyanine, a derivative of phthalocyanine, naphthalocyanine or a derivative of naphthalocyanine, and it is more preferred that the Ingredient X be phthalocyanine or a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the laminated glass, it is preferred that the Ingredient X have a structural unit in which an oxygen atom is bonded to a vanadium atom.

The Ingredient X corresponds also to the heat shielding substance. From the viewpoint of effectively enhancing the heat shielding property, it is preferred that the first resin layer contain the Ingredient X. The first resin layer need not contain the Ingredient X. The content of the Ingredient X in the first resin layer may be smaller than the content of the Ingredient X in the second resin layer. From the viewpoint of effectively enhancing the heat shielding property, it is preferred that the second resin layer contain the Ingredient X. One kind of the Ingredient X may be used alone, and two or more kinds thereof may be used in combination.

From the viewpoint of effectively enhancing the heat shielding property, it is preferred that the content of the Ingredient X satisfy the following preferred range.

In 100% by weight of the layer containing Ingredient X (the first resin layer or the second resin layer), the content of the Ingredient X is preferably 0.001% by weight or more, more preferably 0.005% by weight or more, further preferably 0.01% by weight or more, especially preferably 0.02% by weight or more. In 100% by weight of the layer containing Ingredient X (the first resin layer or the second resin layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

It is preferred that the first resin layer contain the heat shielding particles. The first resin layer need not contain heat shielding particles. The content of the heat shielding particles in the first resin layer may be smaller than the content of the heat shielding particles in the second resin layer. It is preferred that the second resin layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

From the viewpoint of further enhancing the heat shielding property of the laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding property of the laminated glass, cesium-doped tungsten oxide particles are especially preferred. From the viewpoint of further enhancing the heat shielding property of the laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the layer containing the heat shielding particles (the first resin layer or the second resin layer), the content of the heat shielding particles is preferably 0.01% by weight or more, more preferably 0.1% by weight or more, further preferably 1% by weight or more, especially preferably 1.5% by weight or more. In 100% by weight of the layer containing the heat shielding particles (the first resin layer or the second resin layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

Metal Salt:

It is preferred that the first resin layer contain an alkali metal salt, an alkaline earth metal salt or a metal salt which is a magnesium salt (hereinafter, these are sometimes described as Metal salt M). It is preferred that the second resin layer contain the Metal salt M. By the use of the Metal salt M, it becomes easy to control the adhesivity between the resin layer, and the infrared reflective layer and a lamination glass member. One kind of the Metal salt M may be used alone, and two or more kinds thereof may be used in combination.

It is preferred that the Metal salt M contain metal which is Li, Na, K, Rb, Cs, Mg, Ca, Sr or Ba. It is preferred that the metal salt included in the resin layer contain K or Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the layer containing the Metal salt M (the first resin layer or the second resin layer) is preferably 5 ppm or more, more preferably 10 ppm or more, further preferably 20 ppm or more, preferably 300 ppm or less, more preferably 250 ppm or less and further preferably 200 ppm or less. When the total of the contents of Mg and K is the above lower limit or more and the above upper limit or less, the adhesivity between the resin layer, and the infrared reflective layer and a lamination glass member can be controlled more satisfactorily.

Ultraviolet Ray Screening Agent:

It is preferred that the first resin layer contain an ultraviolet ray screening agent. It is preferred that the second resin layer contain an ultraviolet ray screening agent. By the use of an ultraviolet ray screening agent, even when the laminated glass is used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the layer containing the ultraviolet ray screening agent (the first resin layer or the second resin layer), the content of the ultraviolet ray screening agent is preferably 0.1% by weight or more, more preferably 0.2% by weight or more, further preferably 0.3% by weight or more, especially preferably 0.5% by weight or more. In 100% by weight of a layer containing the ultraviolet ray screening agent (the first resin layer or the second resin layer), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period is further suppressed. In particular, by setting the content of the ultraviolet ray screening agent to be 0.2% by weight or more in 100% by weight of a layer containing the ultraviolet ray screening agent, the lowering in visible light transmittance of the laminated glass after the lapse of a certain period of time can be significantly suppressed.

Oxidation Inhibitor:

It is preferred that the first resin layer contain an oxidation inhibitor. It is preferred that the second resin layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

In order to maintain high visible light transmittance of the laminated glass over a long period of time, it is preferred that the content of the oxidation inhibitor be 0.1% by weight or more in 100% by weight of the layer containing the oxidation inhibitor (the first resin layer or the second resin layer). Moreover, it is preferred that the content of the oxidation inhibitor be 2% by weight or less in 100% by weight of the layer containing the oxidation inhibitor.

Other Ingredients:

Each of the first resin layer and the second resin layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(First and Second Lamination Glass Members)

Examples of the first and second lamination glass members include a glass plate, a PET (polyethylene terephthalate) film, and the like. As the laminated glass, laminated glass in which an intermediate layer is sandwiched between a glass plate and a PET film or the like, as well as laminated glass in which an intermediate layer is sandwiched between two glass plates, is included. The laminated glass is a laminate provided with a glass plate, and it is preferred that at least one glass plate be used. It is preferred that each of the first and second lamination glass members be a glass plate or a PET (polyethylene terephthalate) film and the laminated glass include at least one glass plate as the first and second lamination glass members. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured plate glass, net plate glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

It is preferred that each of the first lamination glass member and the second lamination glass member be clear glass or heat-ray absorbing plate glass. It is preferred that the first lamination glass member be clear glass because the clear glass is high in infrared transmittance, and provides the laminated glass with higher heat shielding property. It is preferred that the second lamination glass member be heat ray-absorbing plate glass because the heat ray-absorbing plate glass is low in infrared transmittance, and provides the laminated glass with higher heat shielding property. It is preferred that the heat-ray absorbing plate glass be green glass. It is preferred that the first lamination glass member be clear glass, and the second lamination glass member be heat-ray absorbing plate glass. The heat-ray absorbing plate glass is heat-ray absorbing plate glass conforming to JIS R3208.

(Using Method of Laminated Glass, Head-Up Display System, and Method for Producing Head-Up Display System)

When the laminated glass is used, the aforementioned laminated glass is attached to the opening in such a manner that the first lamination glass member is situated on the exterior space side and the second lamination glass member is situated on the interior space side in the building or in the vehicle.

To be more specific, the laminated glass is attached to the opening in such a manner that the first lamination glass member is situated on the exterior space side and the second lamination glass member is situated on a side of the interior space. That is, the laminated glass is attached so that the arrangement in the order of the exterior space/first lamination glass member/first resin layer/infrared reflective layer/(second resin layer/)second lamination glass member/interior space is achieved. The above arrangement form includes the case where other member is arranged between the exterior space and the first lamination glass member, and includes the case where other member is arranged between the interior space and the second lamination glass member.

The head-up display system includes the laminated glass, and a light source device for irradiating the laminated glass with light for image display. The light source device can be attached, for example, to a dashboard in a building or a vehicle. By irradiating the display region of the laminated glass with light from the light source device, it is possible to achieve image display.

A head-up display system can be produced by conducting the step of attaching the aforementioned laminated glass to the opening in such a manner that the first lamination glass member is situated on the exterior space side and the second lamination glass member is situated on the interior space side in the building or in the vehicle. It is preferred that the laminated glass be a laminated glass that can be used in a head-up display system.

The laminated glass is suitably used for a windshield of a car. It is preferred that the laminated glass be a laminated glass that can be used for a windshield of a car.

Hereinafter, the present invention will be described in more detail with reference to examples and comparative examples. The present invention is not limited only to these examples.

The following materials were prepared.
(Thermoplastic Resin)
Polyvinyl acetal resin (PVB, average polymerization degree: 1700, content of hydroxyl group: 30.5% by mole, acetylation degree: 1% by mole, acetalization degree: 68.5% by mole)

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.
(Plasticizer)
Triethylene glycol di-2-ethylhexanoate (3GO)
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.): 0.2 parts by weight
(Oxidation Inhibitor)
BHT (2,6-di-t-butyl-p-cresol)
(Coloring Agent)
NIR-43V (Ingredient X, phthalocyanine compound, containing vanadium as central metal, maximum absorption wavelength: 755 nm, "NIR-43V" available from YAMADA CHEMICAL CO., LTD.)
FF IRSORB 203 (Ingredient X, naphthalocyanine compound, maximum absorption wavelength: 850 nm, "FF IRSORB 203" available from Fujifilm Corporation)
IR-906 (Ingredient X, phthalocyanine compound, containing vanadium as central metal, maximum absorption wavelength: 930 nm, "EX color 906" available from NIPPON SHOKUBAI CO., LTD.)
IR-915 (Ingredient X, phthalocyanine compound, containing vanadium as central metal, maximum absorption wavelength: 980 nm, "EX color 915" available from NIPPON SHOKUBAI CO., LTD.)

The following infrared reflective layer was prepared.
(Infrared Reflective Layer)
Nano90S (3M, multilayer resin film, "Multilayer Nano 90S" available from Sumitomo 3M Limited)

The following lamination glass members were prepared.
(Lamination Glass Members)
Clear glass (2.5 mm in thickness)
Green glass (heat-ray absorbing plate glass, 2 mm in thickness)

Example 1

Preparation of First Resin Layer:
The following ingredients were mixed, and kneaded sufficiently with a mixing roll to obtain a composition for forming a first resin layer.

Polyvinyl acetal resin (PVB, average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in the obtained resin layer.

BHT (2,6-di-t-butyl-p-cresol): an amount that is to be 0.2% by weight in the obtained resin layer.

The obtained composition for forming a first resin layer is extruded with an extruder to obtain a first resin layer having the thickness and the wedge angle shown in the following Table 1.

Preparation of Second Resin Layer:
The following ingredients were mixed, and kneaded sufficiently with a mixing roll to obtain a composition for forming a second resin layer.

Polyvinyl acetal resin (PVB, average polymerization degree: 1700, content of hydroxyl group: 30.5% by mole, acetylation degree: 1% by mole, acetalization degree: 68.5% by mole): 100 parts by weight Triethylene glycol di-2-ethylhexanoate (3GO): 40 parts by weight NIR-43V (Ingredient X, phthalocyanine compound, containing vanadium as central metal, "NIR-43V" available from YAMADA CHEMICAL CO., LTD.): an amount that is to be 0.009% by weight in the obtained resin layer.

Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in the obtained resin layer.

BHT (2,6-di-t-butyl-p-cresol): an amount that is to be 0.2% by weight in the obtained resin layer.

The obtained composition for forming a second resin layer was extruded with an extruder to obtain a second resin layer. The second resin layer was rectangular, and the thickness of the second resin layer was 380 μm. Further, NIR-43V serving as a coloring agent was uniformly dispersed over the whole area of the obtained second resin layer.

Preparation of Infrared Reflective Layer, First Lamination Glass Member, and Second Lamination Glass Member:

As the infrared reflective layer, Nano90S (3M, multilayer resin film, "Multilayer Nano 90S" available from Sumitomo 3M Limited) was prepared.

As the first lamination glass member, clear glass (2.5 mm in thickness, size: 1.0 m in length×1.0 m in width) was prepared.

As the second lamination glass member, green glass (heat-ray absorbing plate glass, 2 mm in thickness, size: 1.0 m in length×1.0 m in width) was prepared.

Preparation of Laminated Glass:

The first lamination glass member, the first resin layer, the infrared reflective layer, the second resin layer, and the second lamination glass member were layered in this order to obtain a laminated glass. The wedge angle of the first laminate of the first lamination glass member and the first resin layer was the same as the wedge angle of the first resin layer. Further, since NIR-43V serving as a coloring agent is uniformly dispersed over the whole area of the second resin layer, the interlayer film for laminated glass configured by the first resin layer, the infrared reflective layer, and the second resin layer, and the obtained laminated glass have the coloring agent over the entire surface, and the range of 40 mm to 160 mm from the one end being thin in thickness was made to be a region for display. Therefore, the obtained interlayer film for laminated glass and the laminated glass had the coloring agent in the region for display.

Examples 2 to 8 and Comparative Examples 1 to 3

A laminated glass was obtained in the same manner as that in Example 1 except that the configuration of the interlayer film was changed to those shown in the following Tables 1 to 3.

In Comparative Examples 1, 2, no coloring agent was used. In Comparative Example 1, the interlayer film was not made to be wedge-like. In Examples 2 to 8 and Comparative Examples 1 to 3, in the first resin layer and the second resin layer, the ultraviolet ray screening agent and the oxidation inhibitor as those used in Example 1 were mixed in the same mixing amounts in the resin layers as those in Example 1. The coloring agent was mixed in the mixing amount shown in the following Tables 1 to 3 per 100% by weight of the obtained resin layer.

(Evaluation)

(1) Multiple Images

The obtained laminated glass was installed at a position of the windshield with one end of the interlayer film down. The information to be displayed, which is emitted from a display unit installed below the sheet of laminated glass, was reflected in the sheet of laminated glass to visually confirm the presence or absence of multiple images at a prescribed position. For evaluating the effect of suppressing multiple images, the display information included a thick line part and a thin line part. The multiple images were judged according to the following criteria.

[Criteria for Judgment in Multiple Images]

⊚: Completely no multiple images are observed, and both of the image of the thick line part and the image of the thin line part are clearly displayed.

○: No multiple images are observed, and the image of the thick line part is clearly displayed, but the clearness of the image of the thin line is slightly inferior (practically usable).

x: Multiple images are observed.

The details and the results are shown in the following Tables 1 to 3. In Table, the description of the ultraviolet ray screening agent and the oxidation inhibitor was omitted.

TABLE 1

| | | | | | Example 1 | Example 2 | Example 3 | Example 4 |
|---|---|---|---|---|---|---|---|---|
| Configuration | First resin layer | Thermoplastic resin | Kind | — | PVB | PVB | PVB | PVB |
| | | | Mixing amount | parts by weight | 100 | 100 | 100 | 100 |
| | | Plasticizer | Kind | — | 3GO | 3GO | 3GO | 3GO |
| | | | Mixing amount | parts by weight | 40 | 40 | 40 | 40 |
| | | Thickness of other end | | μm | 1496 | 1524 | 1487 | 1489 |
| | | Thickness of one end | | μm | 767 | 785 | 775 | 762 |
| | | Wedge angle | | mrad | 0.7 | 0.7 | 0.7 | 0.7 |
| | Infrared reflective layer | | | | Nano90s | Nano90s | Nano90s | Nano90s |
| | Second resin layer | Thermoplastic resin | Kind | — | PVB | PVB | PVB | PVB |
| | | | Mixing amount | parts by weight | 100 | 100 | 100 | 100 |
| | | Plasticizer | Kind | — | 3GO | 3GO | 3GO | 3GO |
| | | | Mixing amount | parts by weight | 40 | 40 | 40 | 40 |
| | | Coloring agent | Kind | — | NIR-43V | FF IRSORB 203 | IR-906 | IR-915 |
| | | | Maximum absorption wavelength | — | 755 | 850 | 930 | 980 |
| | | | Mixing amount | % by weight | 0.009 | 0.02 | 0.04 | 0.08 |
| | Region for display | Presence or absence of coloring agent | | — | Presence | Presence | Presence | Presence |
| | | Proportion of region where coloring agent present in region for display (% by area) | | % | 100 | 100 | 100 | 100 |
| Evaluation | Multiple images | | | | ⊚⊚ | ○ | ○ | ○ |

TABLE 2

|  |  |  |  |  | Example 5 | Example 6 | Example 7 | Example 8 |
|---|---|---|---|---|---|---|---|---|
| Configuration | First resin layer | Thermoplastic resin | Kind | — | PVB | PVB | PVB | PVB |
|  |  |  | Mixing amount | parts by weight | 100 | 100 | 100 | 100 |
|  |  | Plasticizer | Kind | — | 3GO | 3GO | 3GO | 3GO |
|  |  |  | Mixing amount | parts by weight | 40 | 40 | 40 | 40 |
|  |  | Thickness of other end |  | μm | 1154 | 1121 | 1137 | 1165 |
|  |  | Thickness of one end |  | μm | 789 | 761 | 772 | 785 |
|  |  | Wedge angle |  | mrad | 0.4 | 0.4 | 0.4 | 0.4 |
|  | Infrared reflective layer |  |  |  | Nano90s | Nano90s | Nano90s | Nano90s |
|  | Second resin layer | Thermoplastic resin | Kind | — | PVB | PVB | PVB | PVB |
|  |  |  | Mixing amount | parts by weight | 100 | 100 | 100 | 100 |
|  |  | Plasticizer | Kind | — | 3GO | 3GO | 3GO | 3GO |
|  |  |  | Mixing amount | parts by weight | 40 | 40 | 40 | 40 |
|  |  | Coloring agent | Kind | — | NIR-43V | FF IRSORB 203 | IR-906 | IR-915 |
|  |  |  | Maximum absorption wavelength | — | 755 | 850 | 930 | 980 |
|  |  |  | Mixing amount | % by weight | 0.003 | 0.01 | 0.02 | 0.04 |
|  | Region for display | Presence or absence of coloring agent |  | — | Presence | Presence | Presence | Presence |
|  |  | Proportion of region where coloring agent present in region for display (% by area) |  | % | 100 | 100 | 100 | 100 |
| Evaluation | Multiple images |  |  |  | ⊙ | ○ | ○ | ○ |

TABLE 3

|  |  |  |  |  | Comparative Example 1 | Comparative Example 2 | Comparative Example 3 |
|---|---|---|---|---|---|---|---|
| Configuration | First resin layer | Thermoplastic resin | Kind | — | PVB | PVB | PVB |
|  |  |  | Mixing amount | parts by weight | 100 | 100 | 100 |
|  |  | Plasticizer | Kind | — | 3GO | 3GO | 3GO |
|  |  |  | Mixing amount | parts by weight | 40 | 40 | 40 |
|  |  | Thickness of other end |  | μm | 1488 | 1145 | 782 |
|  |  | Thickness of one end |  | μm | 762 | 772 | 773 |
|  |  | Wedge angle |  | mrad | 0.7 | 0.4 | 0 |
|  | Infrared reflective layer |  |  |  | Nano90s | Nano90s | Nano90s |
|  | Second resin layer | Thermoplastic resin | Kind | — | PVB | PVB | PVB |
|  |  |  | Mixing amount | parts by weight | 100 | 100 | 100 |
|  |  | Plasticizer | Kind | — | 3GO | 3GO | 3GO |
|  |  |  | Mixing amount | parts by weight | 40 | 40 | 40 |
|  |  | Coloring agent | Kind | — | — | — | NIR-43V |
|  |  |  | Maximum absorption wavelength | nm | — | — | 755 |
|  |  |  | Mixing amount | % by weight | — | — | 0.009 |
|  | Region for display | Presence or absence of coloring agent |  | — | Absence | Absence | Presence |
|  |  | Proportion of region where coloring agent present in region for display (% by area) |  | % | 0 | 0 | 100 |
| Evaluation | Multiple images |  |  |  | x | x | x |

EXPLANATION OF SYMBOLS 1, 1A: First lamination glass member
2, 2A: First resin layer
3, 3A: Infrared reflective layer
4, 4A: Second resin layer
5, 5A: Second lamination glass member
10, 10A: Interlayer film
10a: One end
10b: Other end
11, 11A: Laminated glass
11a: One end
11b: Other end
R1: Display region
R2: Surrounding region
R3: Shading region

The invention claimed is:

1. An interlayer film for laminated glass for use in a laminated glass serving as a head-up display,
the interlayer film having a region for display corresponding to a display region of the head-up display,
the interlayer film comprising:
an infrared reflective layer;
a first resin layer containing a thermoplastic resin; and
a second resin layer containing a thermoplastic resin,
the infrared reflective layer being a multilayer resin film,
the first resin layer being arranged on a first surface side of the infrared reflective layer, the second resin layer being arranged on a second surface side opposite to the first surface of the infrared reflective layer,
at least one of the first resin layer and the second resin layer having a wedge angle of 0.1 mrad or more,
at least one of the first resin layer and the second resin layer containing a coloring agent in the region for display.

2. The interlayer film for laminated glass according to claim 1, wherein both of the first resin layer and the second resin layer have a wedge angle of 0.1 mrad or more.

3. The interlayer film for laminated glass according to claim 1, wherein one of the first resin layer and the second resin layer has a wedge angle of 0.1 mrad or more, and the other of the first resin layer and the second resin layer has a wedge angle of less than 0.1 mrad.

4. The interlayer film for laminated glass according to claim 3, wherein the resin layer having a wedge angle of less than 0.1 mrad contains the coloring agent.

5. The interlayer film for laminated glass according to claim 1, wherein the coloring agent is a phthalocyanine compound, a naphthalocyanine compound, or an anthracyanine compound.

6. The interlayer film for laminated glass according to claim 1, wherein
the thermoplastic resin in the first resin layer is a polyvinyl acetal resin, and
the thermoplastic resin in the second resin layer is a polyvinyl acetal resin.

7. The interlayer film for laminated glass according to claim 1, wherein
the first resin layer contains a plasticizer, and
the second resin layer contains a plasticizer.

8. A laminated glass comprising:
a first lamination glass member;
a second lamination glass member; and
the interlayer film for laminated glass according to claim 1,
the first lamination glass member being arranged on an outer side of the first resin layer, the second lamination glass member being arranged on an outer side of the second resin layer.

9. The laminated glass according to claim 8, wherein
the laminated glass is a laminated glass that is to be attached to an opening between an exterior space, and an interior space to which a heat ray is incident from the exterior space in a vehicle, in such a manner that the first lamination glass member is situated on a side of the exterior space, and the second lamination glass member is situated on a side of the interior space, and
the first resin layer has a wedge angle of 0.1 mrad or more.

10. The laminated glass according to claim 8, wherein
the laminated glass is a laminated glass that is to be attached to an opening between an exterior space, and an interior space to which a heat ray is incident from the exterior space in a vehicle, in such a manner that the first lamination glass member is situated on a side of the exterior space, and the second lamination glass member is situated on a side of the interior space, and
the second resin layer contains a coloring agent in the region for display.

11. A method for producing a head-up display system, comprising:
in a building or a vehicle having an opening between an exterior space, and an interior space to which a heat ray is incident from the exterior space, and a light source device for irradiating the laminated glass with light for image display,
a step of attaching the laminated glass according to claim 8 to the opening in such a manner that the first lamination glass member is situated on a side of the exterior space, and the second lamination glass member is situated on a side of the interior space.

12. A laminated glass serving as a head-up display,
the laminated glass having a display region of the head-up display,
the laminated glass comprising:
a first lamination glass member;
a second lamination glass member; and
an interlayer,
the interlayer film having a region for display corresponding to the display region of the head-up display,
the interlayer film including an infrared reflective layer, a first resin layer containing a thermoplastic resin, and a second resin layer containing a thermoplastic resin,
the infrared reflective layer being a multilayer resin film,
the first resin layer being arranged on a first surface side of the infrared reflective layer, the second resin layer being arranged on a second surface side opposite to the first surface of the infrared reflective layer,
the first lamination glass member being arranged on an outer side of the first resin layer, the second lamination glass member being arranged on an outer side of the second resin layer,
at least one of a first laminate of the first lamination glass member and the first resin layer, and a laminate of the second resin layer and the second lamination glass member having a wedge angle of 0.1 mrad or more,
at least one of the first resin layer and the second resin layer containing a coloring agent in the region for display.

13. The laminated glass according to claim 12, wherein at least one of the first resin layer and the second resin layer have a wedge angle of 0.1 mrad or more.

* * * * *